United States Patent [19]

Okita et al.

[11] Patent Number: 4,734,112

[45] Date of Patent: Mar. 29, 1988

[54] LIQUID MEMBRANE

[75] Inventors: Koichi Okita; Shinichi Toyooka; Shigeru Asako; Katsuya Yamada, all of Osaka, Japan

[73] Assignee: Sumitomo Electric Industries, Ltd., Osaka, Japan

[21] Appl. No.: 781,602

[22] Filed: Sep. 30, 1985

[30] Foreign Application Priority Data

Sep. 28, 1984 [JP] Japan .................................. 59-205329

[51] Int. Cl.$^4$ ............................................. B01D 13/00
[52] U.S. Cl. ....................................... 55/158; 210/638; 210/490
[58] Field of Search ..................... 210/638, 321.1, 490, 210/500, 23, 654; 55/16, 158

[56] References Cited

U.S. PATENT DOCUMENTS

| | | | |
|---|---|---|---|
| 3,657,113 | 4/1972 | Stancell et al. | 210/321.1 X |
| 3,957,504 | 5/1976 | Ito et al. | 210/638 X |
| 4,107,049 | 8/1978 | Sano et al. | 210/490 |
| 4,230,463 | 10/1980 | Henis et al. | 55/16 |

*Primary Examiner*—Frank Spear
*Attorney, Agent, or Firm*—Sughrue, Mion, Zinn, Macpeak, and Seas

[57] ABSTRACT

A liquid membrane is disclosed, which comprises a solvent, an active species capable of facilitated transport of a specific gas, and a support for maintaining a liquid body which has a mixture of said solvent and active species dissolved therein, said support being a porous polytetrafluoroethylene film one surface of which is hydrophobic and the other of which is hydrophilic.

11 Claims, No Drawings

LIQUID MEMBRANE

BACKGROUND OF THE INVENTION

The present invention relates to a liquid membrane used in facilitated transport of a specific gas. More specifically, the invention relates to a liquid membrane using a porous polytetrafluoroethylene support one surface of which is first roughened by a physical means, wherein the support has a polymerized layer of a nitrogen-containing compound chemically deposited thereon so as to provide an increased affinity for liquids.

Membrane technology using ethyl cellulose, acetyl cellulose or silicon-carbonate copolymer membranes to separate a specific component gas from a gaseous mixture containing the same has been the subject of extensive research. These membranes are made of solid materials and are hence referred to as solid membranes. In order to separate the specific gas component in an economical and efficient manner, two requirements must be met: (1) a membrane material that permits the selective passage of the gas component to be separated must be selected; and (2) the membrane must be made as thin as possible. Most of the materials known today for use in solid membranes have low gas selectivities and those materials which have relatively high selectivities are only capable of very low rates of gas permeation.

Facilitated tranport of a particular gas can be realized by using a liquid membrane of a material having a high degree of affinity for the gas to be separated. As shown in U.S. Pat. Nos. 3,865,890, 3,951,621, 4,015,955 and 4,060,566, ethylene can be selectively concentrated from a mixture of methane, ethane and ethylene using a nylon-6.6 membrane impregnated with an aqueous solution of $AgNO_3$. The membrane disclosed in these patents is rendered hydrophilic by incorporation of a hydrophilic polymer such as polyvinyl alcohol, but the life of the membrane is not very long since water used as the solvent for the aqueous solution of Ag ions will unavoidably evaporate during the use of the membrane.

U.S. Pat. Nos. 3,396,510, 3,819,806 and 4,119,408 show that acidic gas components such as $CO_2$, $H_2S$ and $SO_2$ can be selectively permeated through a polyethersulfone membrane impregnated with an aqueous solution of $K_2CO_3$. But this membrane has the same problem as in the case of ethylene separation discussed above.

European Patent Application No. 98731/1984 shows that oxygen can be selectively separated from the air using a nylon-6.6 membrane impregnated with a transition metal complex of a Schiff base dissolved in a solvent such as lactone or amide. In the Example therein, a nylon-6.6 membrane with a thickness of 130 $\mu$m was used and this suggests the presence of a liquid membrane that was at least 130 $\mu$m thick.

This membrane system is substantially free from the problem of solvent evaporation because the liquid barrier is made not of water, but of organic solvents such as lactone and amide. However, the life of the system is short because the transition metal complex of a Schiff base is irreversibly oxidized during operation. In addition, the liquid barrier that is impregnated into the nylon-6.6 membrane cannot be made thinner than 130 $\mu$m, preferably as thin as a few micrometers.

SUMMARY OF THE INVENTION

One object, therefore, of the present invention is to provide a liquid barrier in a liquid membrane that is not thicker than a few micrometers and which yet is capable of enhanced transport of a specific gas component.

Another object of the invention is to provide a membrane support one surface of which does not dissolve in solvents but has a suitable amount of affinity therefore. In order to make a liquid barrier not in the form of an aqueous solution but in the form of an organic solution with low volatility solvents such as lactone, dimethylformamide and N-methylpyrrolidone are used. These solvents will dissolve known porous support materials such as polysulfones and polyamides, so it is necessary to use a support material that will not dissolve in these organic solvents.

DETAILED DESCRIPTION OF THE INVENTION

The liquid membrane in accordance with the invention is composed of a solvent, an active species for performing facilitated transport of a specific gas, and a support. The support is made of porous polytetrafluoroethylene (hereinafter abbreviated as PTFE) and is characterized by having one hydrophilic surface in order to make contact with a mixed solution of the solvent and active species and to retain this mixed solution in the form of a thin film. In order to provide such hydrophilic surface, the support must be given both a physical treatment for roughening one surface and a chemical treatment for depositing a layer of a non-PTFE compound on that surface. If only one of these two treatments is applied, a liquid barrier that will maintain a uniform thickness cannot be obtained, or even if this is possible, the resulting membrane has a very short life.

The PTFE used as the support material is insoluble in almost all solvents known today, so it can be used in supports for liquid barriers employing solvents of high polarity such as dimethylformamide (hereinafter DMF) and N-methylpyrrolidone (hereinafter NMP). However, because of high polarity, DMF and NMP exhibit such a great surface tension that they are incapable of wetting the surface of PTFE satisfactorily. As a result, the porous PTFE membrane cannot be put to service in any manner other than where a pool of a mixed solution of solvent and active species is placed on the membrane, thus producing an undesirably thick liquid barrier.

It therefore becomes important for the purposes of the present invention to render one surface of the porous PTFE hydrophilic so that it is wettable by polar solvents. The intensity of this hydrophilic treatment determines the thickness in which the liquid barrier made of the solvent and active species can remain stable.

The physical treatments for providing a roughened surface include graining with a metal brush, etc., heat treatment in which only the surface layer of PTFE is thermally decomposed, laser treatment using the laser energy as a heat source, low-temperature plasma etching using a non-polymerizable gas, and sputter etching using Rf energy, which are described in U.S. Pat. Nos. 4,297,187, and 4,311,828. By selecting a proper method from among these methods, a surface roughness in the range of 1 to 100 $\mu$m preferably 2 to 20 $\mu$m, can be obtained. If a very fine texture with a roughness of about several micrometers is desired, lasers or Rf energy is preferably used.

U.S. Pat. Nos. 3,664,915, 3,953,566, 4,082,893, and 4,248,942 provide porous PTFE by stretching and expanding operations. The structures produced by such techniques consist of fibers and nodes interconnected by the fibers. Such structures are preferred starting materials since they provide for a great latitude in selection of porosity and pore size. If the porous PTFE is subjected to sputtering or plasma etching, the fibers in the treated surface are cut and subsequently decomposed to provide a texture structure consisting essentially of nodes. If, on the other hand, only the surface layer of the porous PTFE is thermally decomposed by scanning with a $CO_2$ laser beam, not only the fibers but also a part of the nodes is volatilized.

The choice of a suitable method of physical treatment depends on the required thickness of the liquid barrier.

The physical treatment for roughening one surface of the porous PTFE is followed by a chemical treatment. The surface subjected to roughening by a physical treatment has a reduced angle of contact with the highly polar DMF or NMP and its affinity for these solvents appears to have increased in comparison with the untreated surface. In fact, however, the roughened surface of PTFE causes little effects on its inherent nature and the increase in its affinity for polar solvents is negligible. In order to achieve an increased affinity for such solvent, the surface of the PTFE must be covered with a thin layer of a compound having a chemical structure similar to that of the polar solvents. This object is insufficiently achieved by merely performing "tetraetching", i.e., withdrawal of fluorine atoms using sodium-naphthalene complex or other suitable etchants. The preferred chemical treatment is one depending on plasma polymerization for depositing a compound similar to the solvent component of the final liquid barrier. As described in U.S. Pat. Nos. 3,657,113, and 4,199,448, the plasma polymerization is realized by introducing a polymerizable gas into a bell jar or a tubular reactor while a glow discharge is maintained by application of radio frequencies, microwaves or d.c. current. Polymerizable gases that can be used with advantage are nitrogen-containing cyclic compounds that include pyridines such as 4-vinylpyridine, 2-vinylpyridine, 4-ethylpyridine and 5-vinyl-2-methylpyridine; pyrrolidone derivatives such as N-methylpyrrolidone and N-vinylpyrrolidone; amines such as 4-methylbenzylamine and N-butylamine; and pyridine derivatives such as picoline and lutidine. Oxygen-containing compounds could be used as polymerizable gases but they are by no means advantageous over the nitrogen-containing compounds from the viewpoint of deposition rates of plasma polymers.

If nitrogen-containing compounds, preferably cyclic compounds, are used as polymerizable gases, films of plasma polymer are produced that are about 1 $\mu$m thick and which are composed of a highly cross-linked structure. Because of the cross-linked structure, such polymer films will not dissolve in the highly polar solvents which are used to make up a liquid barrier, but they can be swelled by such solvents. This will provide a great advantage for the purpose of maintaining a liquid barrier in the form of a very thin film of a thickness of about several micrometers. The nitrogen-containing compounds listed above will also act as "axial bases" in the sense of the term used in European Patent Application No. 98731/1984. It would of course be possible to form films of plasma polymer even thinner than 0.1 $\mu$m or thicker than 10 $\mu$m by changing the polymerization conditions. However, polymer films thinner than 0.1 $\mu$m have a smaller ability to maintain a liquid barrier stably and it becomes difficult to have a uniform and sound liquid barrier spread over a large surface area. If polymer film is thicker than 10 $\mu$m, cracks will develop because of the internal stress that has occurred in the film during plasma polymerization. Even in the absence of any cracking, the film is unstable and may sometimes separate from the substrate.

Under these circumstance, the particularly preferred thickness of the plasma polymer film may range from 0.3 $\mu$m to 3 $\mu$m. Polymer films having this thickness range are capable of maintaining a liquid barrier with the thickness ranging from 0.1 $\mu$m to 6 $\mu$m.

The other features of the liquid membrane in accordance with the present invention may essentially be the same as described in European Patent Application No. 98731/1984.

The solvents of high polarity include lactams, sulfoxides and amides, and preferably, dimethyl sulfoxide, NMP, propylene carbonate, DMF and gamma-butyrolactam are used. These solvents may contain nitrogen-containing compounds such as polyethyleneimine and tetra-ethylenepentamine, or pyridine and pyrrolidone derivatives used as polymerizable gases in plasma polymerization.

Examples of the active species capable of enhanced transport of oxygen or carbon monoxide gas are complex compounds of transition metals with Schiff bases prepared by dehydrative condensation from ethylenediamine and aldehyde compounds. Illustrative Schiff bases are N,N-bis(salicylidene)ethylenediamine and bis(2-amino-1-benzaldehyde)ethylenediamine. Exemplary transition metals are divalent elements such as Co, Cu and Fe. These active species are dissolved in polar solvents in amounts ranging from $10^{-5}$ to $10^{-3}$ mole, preferably $10^{-4}$ to $10^{-3}$ mole, per unit weight of the liquid barrier. Higher concentrations of the active species will provide increased initial gas selectivities, but their characteristics will vary with time as a result of dimerization or other side reactions. If the concentration of the active species is less than $10^{-5}$ mole the intended effect of the active species is difficult to obtain and only low gas selectivities will result. Therefore, the preferred concentration of the active species is in the range of $10^{-5}$ to $10^{-3}$ mole per g of the liquid barrier.

The process of producing a large-scale module from the liquid membrane of the present invention will start with the shaping of a support that has been provided with a hydrophilic surface but on which no liquid barrier is maintained. In order to provide a large surface area, a support in the form of a bundle of tubes or hollow fibers is packed in a molding container and both ends of the bundle are sealed. The sealant may be an epoxy resin but silicone rubbers having a greater adhesive strength are preferred. After the sealant has solidified, part of the sealed portion is cut open so as to provide a separation module having respective channels for the feed gas, permeate gas and reject gas.

After forming such module, a mixed solution of solvent and active species is introduced in excess amount into the module at the feed gas inlet and the module is pressurized at 1 to 2 kg/cm$^2$ with the reject gas outlet closed. But this pressurization step, the mixed solution is impregnated into the entire part of the hydrophilic surface of the support. Desirably, complete impregnation of the mixed solution is ensured by shaking the whole part of the module. Uniform impregnation of the mixed solution can be realized by monitoring the flow rate of gas coming from the permeate gas outlet because as the impregnation proceeds, a decreasing amount of gas will come out of the module until the point is reached where a minimum flow rate occurs, which indicates that the mixed solution has been impregnated uniformly in every part of the hydrophilic surface of the support.

The following Examples are provided for further illustration of the claimed liquid membrane but are not to be construed as limiting the invention.

EXAMPLE 1

A reactor of the bell jar type having a sheet of Fuoropore FP-010 (porous PTFE membrane manufactured by Sumitomo Electric Industries, Ltd. having an average pore size of 0.1 $\mu$m) placed on an electrode was evacuated to a pressure of 0.01 Torr. Glow discharge was conducted with a radio wave (13.56 MHz) applied at a power of 60 watts.

The reactor was supplied with 4-vinylpyridine until the pressure in the reactor was increased to 0.2 Torr. Plasma polymerization was performed for 30 minutes at a power of 30 watts. The thickness of the polymer deposit as estimated from the increase in weight was 0.5 $\mu$m. The plasma polymer coat on one side was dipped in a dimethylformamide bath. When it was recovered from the solvent bath, the treated surface was found to have a uniform layer of the solvent but only drops of solvent adhered to the untreated surface, The drops of solvent were wiped off and the thickness of the weight of the support resulting from the deposition of that layer was approximately 3 $\mu$m.

EXAMPLE 2

Hollow PTFE fibers (outside diameter: 1.1 mm, inside diameter: 0.6 mm, porosity, 35%, average pore size, 0.1 $\mu$m) were used as a starting material.

The hollow fibers were prepared by first extruding PTFE tubes by the paste method (U.S. Pat. No. 4,225,547), then stretching the tubes longitudinally at a stretch ratio of 2, and finally sintering the stretched tubes at temperatures not lower than 327° C. (U.S. Pat. No. 4,082,893). Only the surface of the outermost layer of each tube was roughened by passing it at a linear speed of 8 m/min, through a furnace wherein flames issued uniformly in the radial direction. Observation with a scanning electron microscope showed that the scorched surface had a roughness of about 10 to 30 $\mu$m.

A plasma polymerization system was supplied with N-vinylpyrrolidone and a plasma polymer was deposited on the outer surface of each of the hollow PTFE fibers under the same conditions as used in Example 1. The deposit of the polymer coat was estimated to have a thickness of 0.35 $\mu$m.

The fibers were dipped in a dimethyl sulfoxide bath. A uniform layer of the solvent was formed on the entire periphery of each fiber, and the thickness of the layer was estimated to be about 8 $\mu$m by measuring the increase in the weight of the fiber.

The interior of each of the fibers was pressurized by introducing air at a pressure of 2 kg/cm$^2$ with the other end of the fiber closed. The dimethyl sulfoxide layer remained strongly adherent on the outer surface of each fiber, causing no foam in the liquid barrier.

EXAMPLE 3

Hollow PTFE fibers having an outside diameter of 1.0 mm, an inside diameter of 0.4 mm, a porosity of 30% and an average pore size of 0.05 $\mu$m were prepared as a starting material by modifying the paste extrusion and reducing longitudinal stretching ratio.

The surface of the outermost layer of each of the hollow fibers was thermally decomposed by scanning with a CO$_2$ laser (100 watts) beam obtained by focusing with a lens system consisting of a condenser, reflector and a conical mirror. By this physical treatment, not only were the fiber portions cut but also the nodes forming the porous structure were volatilized.

The so treated hollow PTFE fibers were set in a plasma treatment unit with a tubular reactor so that they could be transported through the unit. The surface of each fiber was treated by an oxygen gas plasma at 40 watts, producing a fine texture (0.5 $\mu$m roughness) on the surface of the outermost layer of each fiber.

The reactor was supplied with 4-vinylpyridine as a polymerizable gas and plasma polymerization was performed at 30 watts on the fibers running at 1 m/min. Assuming a uniform deposition was effected, the deposited thickness of plasma polymer was calculated to be 0.3 $\mu$m.

A bundle of 3,000 PTFE fibers thus treated was packed in a cylindrical container so that it would have an effective length of 30 cm, leaving a 5-cm portion at each end for subsequent sealing. A silicone rubber of the addition reactive type was applied to both ends of the bundle and cured to cross-link. One sealed end of the bundle was cut open to provide an outlet for permeate gas.

A solution having 10$^{-4}$ mole/g of N,N-bis(2-aminobenzyl) ethylenediamine dissolved in dimethyl sulfoxide was injected into the cylindrical container at the feed gas inlet and the container was pressurized for 10 minutes with a nitrogen gas supplied at 1.5 kg/cm$^2$. In the meantime, the cylinder was rotated to ensure that the solution could be impregnated into the entire surface of the hollow fibers. Excess solution was withdrawn from the container, and immediately thereafter, the container was placed in a refrigerator for storage at 5° C. or below.

The module was taken out of the refrigerator and air at one atmosphere was pumped into the module at the feed inlet while the outlet for permeate gas was held at 30 mmHg. On the product side, an oxygen-rich air (66% O$_2$) was obtained with a calculated O$_2$ permeation rate of $4.2 \times 10^{-5}$ cm$^3$/cm$^2$/sec cmHg.

While the invention has been described in detail and with reference to specific examples thereof, it will be apparent to one skilled in the art that various changes and modifications can be made therein without departing from the spirit and scope thereof.

What is claimed is:

1. A liquid membrane comprising a solvent, an active species capable of enhanced transport of a specific gas, and a support for maintaining a liquid body which has a mixture of said solvent and active species dissolved therein, wherein said support is a porous polytetrafluoroethylene film, one surface of which is hydrophobic and the other surface of which is hydrophilic.

2. The liquid membrane as claimed in claim 1, wherein said porous polytetrafluoroethylene is composed of fibers and nodes interconnected with said fibers, wherein the hydrophilic surface of said polytetrafluoroethylene film is formed by both physical and chemical treatments.

3. The liquid membrane according to claim 2, wherein the physical treatment used to produce the hydrophilic surface is surface roughening.

4. The liquid membrane as claimed in claim 3, wherein said physical treatment is selected from the group consisting of graining with a metal brush, heat treatment in which only the surface layer of PTFE is thermally decomposed, laser treatment using laser energy as a heat source, low-temperature plasma etching using a nonpolymerizable gas and sputter etching using Rf energy.

5. The liquid membrane as claimed in claim 3, wherein the resulting surface roughness is in the range of 1 to 100 μm.

6. The liquid membrane as claimed in claim 2, wherein the chemical treatment used to produce the hydrophilic surface consists of deposition of a plasma polymerized coat of a nitrogen-containing compound.

7. The liquid membrane as claimed in claim 6, wherein the nitrogen-containing compound is at least one member selected from the group consisting of vinylpyridine, 4-ethylpyridine, N-vinylpyrrolidone, N-methylpyrrolidone, 4-picoline, and 3,5-lutidine.

8. The liquid membrane as claimed in claim 6, wherein the plasma polymerized coat has a thickness of 0.1 μm to 10 μm.

9. The liquid membrane as claimed in claim 8, wherein the plasma polymerized coat has a thickness of 0.3 μm to 3 μm.

10. The liquid membrane as claimed in claim 1, wherein the solvent is one or more members selected from the group consisting of gamma-butyrolactone, N-methylpyrolidone, 4-dimethylaminopyridine and 4-aminopyridine, and the active species is a complex compound of a Schiff base and a transition metal.

11. The liquid membrane as claimed in claim 10, wherein said Schiff base is selected from the group consisting of N,N-bis(salicylidene)ethylenediamine and bis(2-amino-1-benzaldehyde)ethylenediamine and said transition metal is selected from the group consisting of cobalt, copper and iron.

* * * * *